United States Patent
Yokura et al.

(10) Patent No.: US 7,154,094 B2
(45) Date of Patent: Dec. 26, 2006

(54) FABRI-PEROT FILTER

(75) Inventors: Hisanori Yokura, Chiryu (JP); Takahiko Yoshida, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/007,277

(22) Filed: Dec. 9, 2004

(65) Prior Publication Data

US 2005/0167597 A1    Aug. 4, 2005

(30) Foreign Application Priority Data

Jan. 29, 2004    (JP)    ............................ 2004-021882

(51) Int. Cl.
G01J 5/02    (2006.01)
(52) U.S. Cl. .................................... 250/343
(58) Field of Classification Search ................ 250/343
See application file for complete search history.

(56) References Cited

U.S. PATENT DOCUMENTS

| | | | |
|---|---|---|---|
| 5,589,689 A * | 12/1996 | Koskinen ............... | 250/339.01 |
| 6,078,395 A * | 6/2000 | Jourdain et al. ............ | 356/519 |
| 6,590,710 B1 | 7/2003 | Hara et al. | |
| 6,813,291 B1 * | 11/2004 | Wang et al. ........... | 372/46.014 |
| 2005/0017177 A1 * | 1/2005 | Tai et al. ................. | 250/338.4 |

* cited by examiner

*Primary Examiner*—David Porta
*Assistant Examiner*—Marcus Taningc
(74) *Attorney, Agent, or Firm*—Posz Law Group, PLC

(57) ABSTRACT

A Fabri-Perot filter includes: a substrate; a first mirror disposed on the substrate; and a movable mirror unit facing the first mirror with a gap therebetween. The movable mirror unit is movable toward the first mirror in a case where a predetermined voltage is applied between the first mirror and the movable mirror unit so that the gap is changeable. The filter is capable of transmitting an infrared light having a predetermined wavelength corresponding to the gap. The movable mirror unit includes a center portion and a periphery portion, which is deformable easier than the center portion.

5 Claims, 3 Drawing Sheets

FABRI-PEROT FILTER

CROSS REFERENCE TO RELATED APPLICATION

This application is based on Japanese Patent Application No. 2004-21882 filed on Jan. 29, 2004, the disclosure of which is incorporated herein by reference.

FIELD OF THE INVENTION

The present invention relates to a Fabri-Perot filter for transmitting an infrared light having a predetermined wavelength.

BACKGROUND OF THE INVENTION

An infrared light filter for transmitting only an infrared light having a predetermined wavelength is, for example, a Fabri-Perot filter. The Fabri-Perot filter is disclosed, for example, in U.S. Pat. No. 6,590,710.

The fabric-Perot filter includes the first mirror as a fixed mirror and the second mirror as a movable mirror. The second mirror is disposed on the first mirror through a silicon oxide film in such a manner that the first and second mirrors face each other, and a cavity having a predetermined gap between the first and second mirrors is provided by the first and second mirrors.

When a voltage, i.e., the electric potential difference, is applied between the first and second mirrors, the second mirror is displaced or deformed by an electrostatic attractive force. Thus, the gap between the first and second mirrors is changed so that only the infrared light having a predetermine wavelength corresponding to the gap can transmit the filter.

However, the second mirror is deformed to be a balloon shape when the second mirror is displaced toward the first mirror. Therefore, the gap between the first and second mirrors becomes inhomogeneous. Accordingly, the range of wavelengths of the infrared light that the filter transmits becomes broader. Therefore, when the infrared light is detected by a detector, the detector has a large noise and low accuracy of the detection of the infrared light having a predetermined wavelength.

SUMMARY OF THE INVENTION

In view of the above-described problem, it is an object of the present invention to provide a Fabri-Perot filter having a narrow range of wavelengths that the filter transmits.

A Fabri-Perot filter includes: a substrate; a first mirror disposed on the substrate; and a movable mirror unit facing the first mirror with a gap therebetween. The movable mirror unit is movable toward the first mirror in a case where a predetermined voltage is applied between the first mirror and the movable mirror unit so that the gap is changeable. The filter is capable of transmitting an infrared light having a predetermined wavelength corresponding to the gap. The movable mirror unit includes a center portion and a periphery portion, which is deformable easier than the center portion.

In the above filter, even when the second mirror unit is displaced by the voltage application, the center portion is not deformed relatively. Therefore, the center portion has a comparatively flat surface so that the movable mirror unit is deformed to be a stew pan bottom. Thus, the distance between the first mirror and the second mirror unit becomes homogenous so that the range of wavelengths of the infrared light that transmits the filter can be narrowed.

Preferably, the infrared light transmits the movable mirror unit, the first mirror and the substrate in a perpendicular direction of the substrate.

Preferably, the periphery portion has a groove. The groove includes two trenches, one of which is disposed at an interface between the periphery portion and the center portion, and the other of which is disposed on a circumference of the periphery portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 5A:
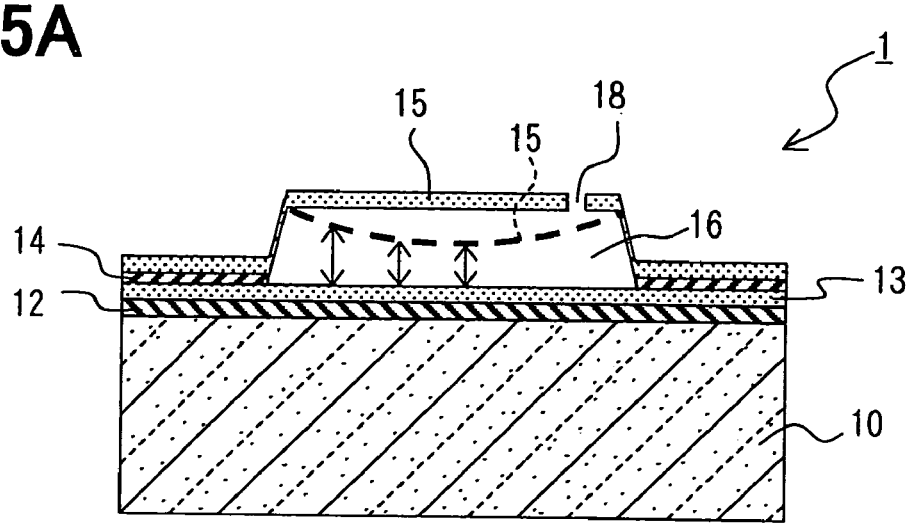
FIG. 5A is a cross sectional view showing a Fabri-Perot filter.
Figure 5B:
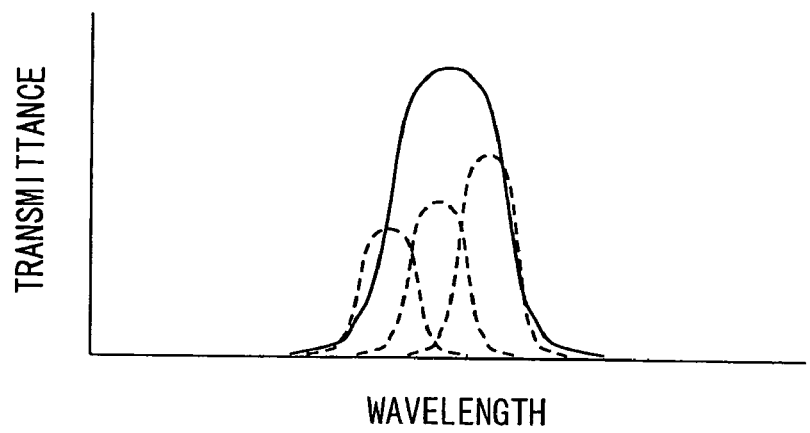
FIG. 5B is a graph showing a relationship between a wavelength and a transmittance of an infrared light, according to a comparison of the first embodiment.

The inventors have preliminarily studied about a Fabri-Perot filter. The filter 1 is shown in FIGS. 5A and 5B. As shown in FIG. 5A, the Fabri-Perot filter 1 includes the first mirror 13 as a fixed mirror and the second mirror 15 as a movable mirror. The first mirror 13 is formed on a substrate 10 through an oxide film 12 as an insulation film. The second mirror 15 is disposed on the first mirror 13 through a silicon oxide film 14. Further, the first and second mirrors 13, 15 face each other, and a cavity 16 having a predetermined gap between the first and second mirrors 13, 15 is provided by the first and second mirrors 13, 15. Each mirror 13, 15 has an electrode (not shown) for applying an electric potential difference between the first and second mirrors 13, 15.

When a voltage, i.e., the electric potential difference, is applied between the first and second mirrors 13, 15, the second mirror 15 is displaced or deformed by an electrostatic attractive force. Thus, the gap between the first and second mirrors 13, 15 is changed so that only the infrared light having a predetermine wavelength corresponding to the gap can transmit the filter 1.

However, in the filter 1, since the second mirror 15 is made of poly crystalline silicon, and has a homogeneous film structure, the second mirror 15 is deformed to be a balloon shape shown as a dotted line in FIG. 5A when the second mirror 15 is displaced toward the first mirror 13. Therefore, the gap between the first and second mirrors 13, 15 becomes inhomogeneous. Accordingly, the range of wavelengths of the infrared light that the filter 1 transmits becomes broader, as shown in FIG. 5B.

Figure 1A:
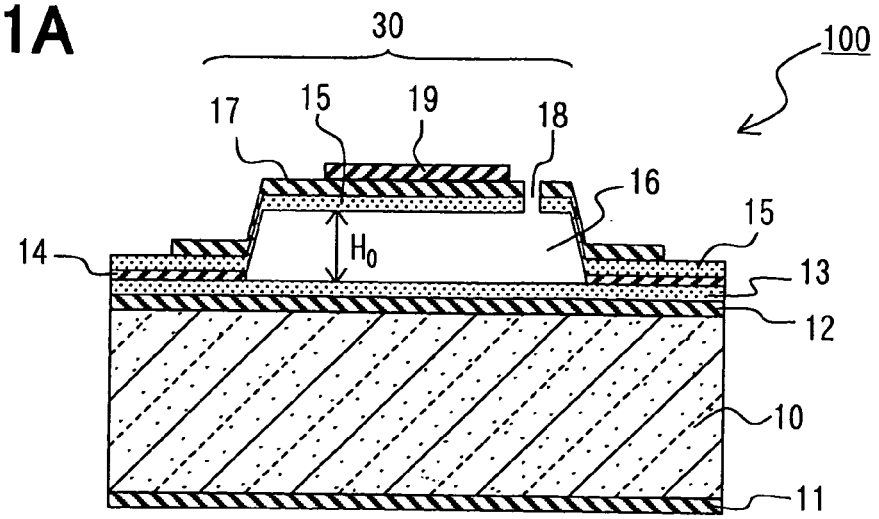
FIG. 1A is a cross sectional view showing a Fabri-Perot filter before a voltage is applied to the filter.
Figure 1B:
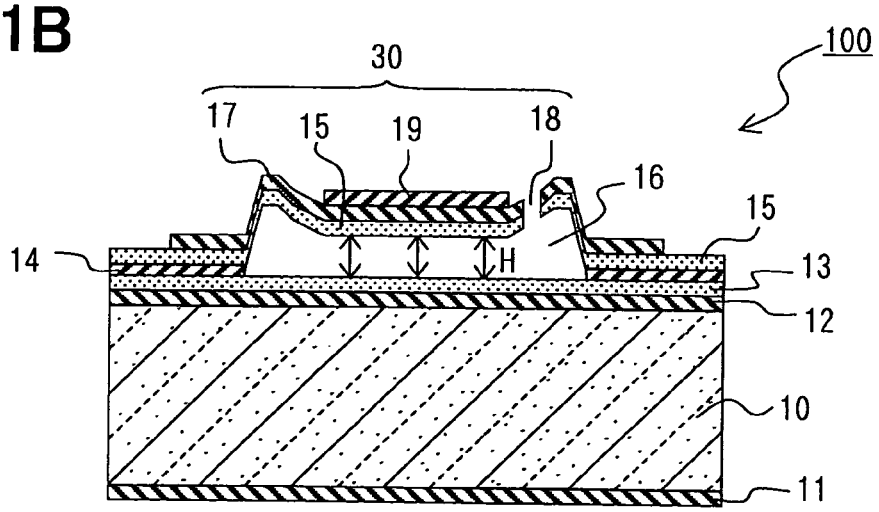
FIG. 1B is a cross sectional view showing the filter after the voltage is applied to the filter, according to a first embodiment of the present invention

In view of the above problem, a Fabri-Perot filter 100 according to a first embodiment of the present invention is provided. The filter 100 is shown in FIGS. 1A and 1B. FIG. 1A shows the filter 100 before a voltage is applied to the filter 100 for displacing the second mirror 15 as a movable mirror, and FIG. 1B shows the filter 100 after the voltage is applied to the filter 100. Specifically, FIG. 1A shows the filter 100 before the second mirror 15 is displaced, and FIG. 1B shows the filter 100 after the second mirror 15 is displaced.

The filter 100 includes the substrate 10, the first mirror 13 as the fixed mirror disposed on the substrate 10, the second mirror 15 as the movable mirror facing the first mirror 15 to provide a gap therebetweeen.

The substrate 10 is a semiconductor substrate made of silicon. An anti-reflection film 11 made of silicon oxide film is disposed on a bottom of the substrate 10. The oxide film 12 as the insulation film made of silicon oxide film is formed on a top of the substrate 10. The oxide film 12 works as an anti-reflection film, and further, insulates the first mirror 13 from the substrate 10. Although the filter 100 includes both of the anti-reflection film 11 and the silicon nitride film 17, the filter 100 can include at least one of the anti-reflection film 11 and the silicon nitride film 17.

The first mirror 13 is disposed on the top of the substrate 10 through the oxide film 12. The first mirror 13 is made of poly crystalline silicon film. The first mirror 13 has an electrode pad (not shown), in which a high concentration impurity is doped. The pad of the first mirror 13 is disposed on a periphery of the first mirror 13. The second mirror 15 also has another electrode pad (not shown), in which a high concentration impurity is doped. The pad of the second mirror 15 is disposed on a periphery of the second mirror 15.

The silicon oxide film 14 is formed on the fixed mirror 13. A part of the silicon oxide film 14 is removed by an etching method. The second mirror 15 is disposed on the other part of the silicon oxide film 14 and disposed above the removed part of the silicon oxide film 14. The second mirror 15 is made of poly crystalline silicon film. Accordingly, the second mirror 15 faces the first mirror 13 through the cavity 16, which is provided by the removed part of the silicon oxide film 14. When the voltage is applied to the first and second mirrors 13, 15, a part of the second mirror 15 disposed on the cavity 16 is displaced toward the first mirror 13.

The cavity 16 is formed in such a manner that a predetermined part of the silicon oxide film 14 is etched through an etching hole 18 with using a silicon nitride film 17 as a mask. The etching hole 18 penetrates the silicon nitride film 17 and the second mirror 15. The silicon nitride film 17 works as a protection film, and is disposed on the second mirror 15. The filter 100 filters and selects a predetermined wavelength of the infrared light in accordance with a distance $H_0$ between the first and second mirrors 13, 15, which is a gap in the cavity 16. Specifically, the infrared light transmits the filter 100 by an interference effect. This is, the infrared light having the wavelength $\lambda$, which is twice as long as the distance $H_0$, selectively transmits the filter 100. Accordingly, when the filter filters the infrared light having the wavelength of $\lambda$, the distance $H_0$ is set to be a half of the wavelength $\lambda$ in a case where the second mirror 15 is not displaced. Here, the initial distance $H_0$ is equal to a thickness of the removed silicon oxide film 14.

When a predetermined voltage is applied between the electrode pads of the first and second mirrors 13, 15, the electro-static force is generated between the first and second mirrors 13, 15 so that the second mirror 15 moves toward the first mirror 13. Therefore, the distance $H_0$ changes from $H_0$ to H. The infrared light having the wavelength of $\lambda$ that is equal to twice the distance H transmits the filter 100.

In the filter 1 shown in FIG. 5A, the second mirror 15 is deformed to be a balloon shape shown in FIG. 5A when the second mirror 15 is displaced toward the first mirror 13. Therefore, the gap between the first and second mirrors 13, 15 becomes inhomogeneous. Accordingly, the range of wavelengths of the infrared light that the filter 1 transmits becomes broader. If the wavelength of the infrared light that transmits the filter 1 becomes broader, an infrared light sensor for detecting the infrared light has a large noise, so that a sensor sensitivity is reduced.

However, the filter 100 includes a reinforcement film 19 disposed on the silicon nitride film 17, which is disposed above the cavity 16. The reinforcement film 19 is formed on a center portion of the cavity 16. Specifically, the reinforcement film 19 is disposed on a center part of the second mirror 15 above the cavity 16 through the silicon nitride film 17. Thus, a movable mirror unit 30 includes the second mirror 15, the silicon nitride film 17 and the reinforcement film 19. Further, the movable mirror unit 30 is composed of a periphery portion and a center portion. The periphery portion includes the second mirror 15 and the silicon nitride film 17, and the center portion includes the second mirror 15, the silicon nitride film 17 and the reinforcement film 19. Here, a proportion of the center portion and the periphery portion are determined in accordance with the displacement of the second mirror 15.

Thus, since the second mirror unit 30 includes the reinforcement film 19 disposed at the center of the second mirror 15, the center portion of the movable mirror unit 30 is thicker than the periphery portion of the movable mirror unit 30. Therefore, when the second mirror 15 is displaced by the voltage application, the periphery portion is deformed, and the center portion is not deformed relatively. Thus, the center portion of the movable mirror unit 30 has a comparatively flat surface after the second mirror 15 is displaced. Specifically, the movable mirror unit 30 is deformed to be a stew pan bottom, as shown in FIG. 1B. Therefore, the distance H between the first mirror 13 and the displaced second mirror 15 becomes homogenous.

Figure 2:
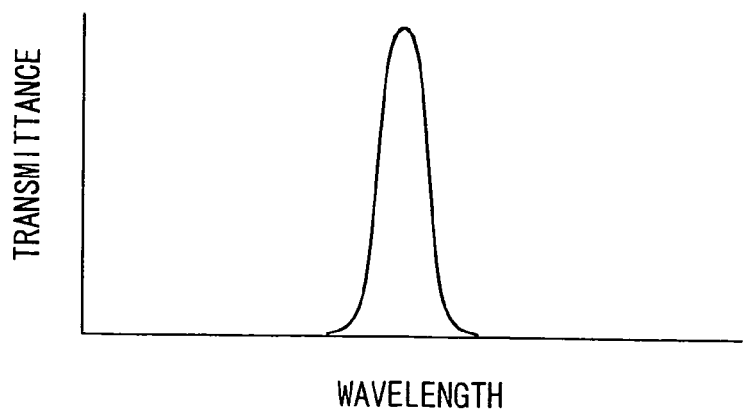
FIG. 2 is a graph showing a relationship between a wavelength and a transmittance of an infrared light, according to the first embodiment.

Accordingly, the range of wavelengths of the infrared light that transmits the filter 100 after the second mirror 15 is displaced can be narrowed, as shown in FIG. 2. When the wavelength of the infrared light that transmits the filter 100 becomes narrower, the infrared light sensor for detecting the infrared light has a small noise, so that a sensor sensitivity is increased.

The distance H after displacement of the second mirror 15 can be controlled by the distance Ho before displacement, the construction of the second mirror 15, and the voltage applied between the first and second mirrors 13, 15. Here, the construction of the second mirror 15 is, for example, concerned about deformability. The distance H is adjusted to be equal to a half of the wavelength $\lambda$ of the infrared light that transmits the filter 100.

The reinforcement film 19 can be made of any material. For example, when the filter 100 has no silicon nitride film 17, the reinforcement film 19 can be made of the same material as the second mirror 15 so that the reinforcement film 19 is formed integrally with the second mirror 15. Further, the reinforcement film 19 can be made of the same material as the silicon nitride film 17 so that the reinforcement film 19 is formed integrally with the silicon nitride film 17. Furthermore, when the reinforcement film 19 is made of high elastic material higher than the second mirror 15, the deformation of the center portion of the movable mirror unit 30 can be much reduced because of the characteristics of the high elastic material. Therefore, the flatness of the surface of the second mirror 15 facing the first mirror 13 in the cavity 16 becomes higher, so that the range of wavelengths of the infrared light that transmits the filter 100 becomes much narrower. The high elastic material is, for example, a diamond like carbon film (i.e., a DLC film), which has high hardness, excellent electric insulation and excellent transparency of the infrared light. In this case, the thickness of the reinforcement film 19 can be reduced, so that optical loss by the reinforcement film 19 is reduced.

Next, the filter 100 is manufactured as follows.

Firstly, the substrate 10 made of silicon is prepared. Then, the anti-reflection film 11 and the oxide film 12 made of silicon oxide are formed on both surface of the substrate 10 by using a thermal oxidation method. The anti-reflection film 11 and the oxide film 12 prevent the infrared light from reflecting on the surface of the substrate 10. The oxide film 12 enhances adhesiveness between the first mirror 13 and the substrate 10. The first mirror 13 is made of poly crystalline silicon, and disposed on the oxide film 12. Further, the oxide film 12 works as an etching stopper for stopping the etching in a forming process of the first mirror 13.

Next, a poly crystalline silicon film is formed on the oxide film 12 by the CVD method (i.e., chemical vapor deposition method). Then, an impurity such as phosphorous is doped in the poly crystalline silicon film so that the doped poly crystalline silicon film has a predetermined resistance. The doped poly crystalline silicon film is etched by a photo lithography method so that the first mirror 13 having a predetermined pattern is formed. Then, the high concentration impurity is doped in the periphery of the first mirror 13 so that the electrode pad is formed. The first mirror 13 can be made of another material as long as the material has excellent transparency of the infrared light, and generates the electrostatic force between the first and second mirrors 13, 15 when the voltage is applied to them. For example, the first mirror 13 can be made of doped single crystal silicon.

After the first mirror 13 is formed, the silicon oxide film 14 is formed on the surface of the first mirror 13 by the CVD method. At this time, the thickness of the silicon oxide film 14 is controlled such that a cavity-to-be-formed region of the silicon oxide film 14 has a predetermined thickness corresponding to the distance $H_0$. Here, the cavity-to-be-formed region of the silicon oxide film 14 is removed by etching so that the cavity 16 is formed.

After the silicon oxide film 14 is formed, a poly crystalline silicon film is formed on the silicon oxide film 14 by the CVD method. Then, the impurity such as phosphorous is doped in the poly crystalline silicon film so that the poly crystalline silicon film has a predetermined resistance. Then, the doped poly crystalline silicon film is patterned into a predetermined pattern by the photo lithography method so that the second mirror 15 is formed. At this time, the high concentration impurity is doped in the periphery of the second mirror 15 so that the electrode pad is provided. The second mirror 15 can be made of another material as long as the material has excellent transparency of the infrared light, and generates the electrostatic force between the first and second mirrors 13, 15 when the voltage is applied to them. For example, the second mirror 15 can be made of doped single crystal silicon.

The silicon nitride film 17 as a protection film is formed on the second mirror 15 by the CVD method, for example. Then, the etching hole 18 is formed in the silicon nitride film 17 and the second mirror 15. The etching hole 18 works for removing the cavity-to-be-formed region of the silicon oxide film 14. The cavity-to-be-formed region of the silicon oxide film 14 is removed through the etching hole 18 with using the silicon nitride film 17 and the second mirror 15 as a mask of the etching. Thus, the cavity 16 having the initial distance $H_0$ between the first and second mirrors 13, 15 is formed. Thus, the second mirror 15 is movable.

After the cavity 16 is formed, the reinforcement film 19 is formed on a part of the silicon nitride film 17 disposed above the cavity 16. The reinforcement film 19 made of a DLC film is formed by a plasma CVD method. The reinforcement film 19 is formed at the center portion of the movable mirror unit 30. The area of the reinforcement film 19 is determined in accordance with the displacement of the second mirror 15 when the voltage is applied, i.e., in accordance with the distance H in the cavity 16 after the second mirror 15 is displaced.

Thus, the filter 100 is completed. The filter 100 can be manufactured by a conventional semiconductor process. Therefore, the manufacturing cost of the filter 100 is low.

The reinforcement film 19 can be formed before the cavity 16 is formed. Further, when a film having a moisture absorption characteristic such as the silicon oxide film 14 is formed, the film is preferably annealed appropriately to prevent a stress in the film from deviating by the moisture absorption.

Although the substrate 10 is made of silicon, the substrate 10 can be made of other materials such as glass and resin.

(Second Embodiment)

Figure 3:
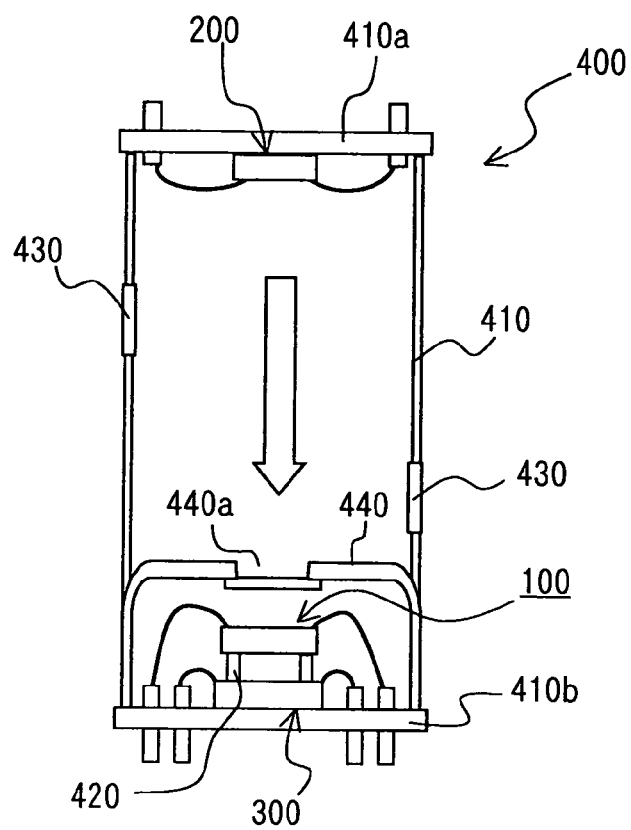
FIG. 3 is a schematic perspective view showing a gas sensor having the filter, according to a second embodiment of the present invention.

The Fabri-Perot filter 100 can be used for an infrared light detection type gas sensor 400 having an infrared light source 200 and an infrared light detector 300, as shown in FIG. 3. The infrared light source 200 emits the infrared light. The infrared light detector 300 detects the infrared light. In the gas sensor 400, the infrared light source 200 is disposed on an upper base 410a of a cylindrical vessel 410. Specifically, the base 410a is disposed on one end of the vessel 410. The infrared light detector 300 is disposed on a lower base 410b, which is disposed on the other end of the vessel 410. The Fabri-Perot filter 100 is mounted on the infrared light detector 300 through a support member 420. The vessel 410 includes an opening 430 for charging and discharging gas as a measurement object. A cap 440 is disposed in the vessel 410 so that the cap 440 limits the infrared light that enters the infrared light detector 300. The cap 440 includes a window 440a for passing the infrared light.

The infrared light source 200 emits the infrared light. Then, the light reaches the filter 100 through the window 440a of the cap 440. The filter 100 transmits only a certain infrared light having a predetermined wavelength, which corresponds to the distance H in the cavity 16. Then the selected infrared light reaches the infrared light detector 300.

Accordingly, the infrared light is emitted from the infrared light source 200 toward the infrared light detector 300. During the infrared light passing through the gas in the vessel 410, a part of the infrared light having a specific wavelength is absorbed in the gas. The gas is a measurement object, and introduced into the vessel 410 through the opening 430. The other part of the infrared light including the specific wavelength reaches the filter 110. The filter transmits only the infrared light having the specific wavelength, a part of which is absorbed in the gas. Then, the selected infrared light reaches the infrared light detector 300.

At this time, the fraction of the absorbed part of the infrared light having the specific wavelength changes in accordance with the concentration of the gas in the vessel 410. Therefore, the intensity of the selected infrared light having the specific wavelength to reach the infrared light detector 300 also changes in accordance with the concentration of the gas in the vessel 410. Thus, the output of the infrared light detector 300 changes in accordance with the concentration of the gas so that the concentration of the gas is measured.

In the gas sensor 400 having the filter 100, since the range of wavelengths of the infrared light that transmits the filter 100 becomes narrower when the second mirror 15 is displaced, the gas sensor 400 has a low noise and high sensor sensitivity.

Although the light source 200 and the detector 300 are disposed on a straight line such that the light source 200 faces the detector 300, the light source 200 can be disposed in parallel to the detector 300 so that the gas sensor provides a reflection type gas sensor.

Although the gas sensor detects the gas concentration, an infrared light sensor having the detector 300 and the filter 100 can be provided. The infrared light sensor merely detects the infrared light.

Although the filter 100 is mounted on the detector 300 through the support member 420, the filter 100 can be mounted on the cap 440 or the vessel 410.

(Third Embodiment)

In the filter 100 shown in FIGS. 1A and 1B, the reinforcement film 19 is formed at the center portion of the movable mirror unit 30 through the silicon nitride film 17 so that the center portion of the movable mirror unit 30 is thicker than the periphery portion of the movable mirror unit 30. However, another construction can be used for the filter 100 having the center portion thicker than the periphery portion of the movable mirror unit 30.

Figure 4:
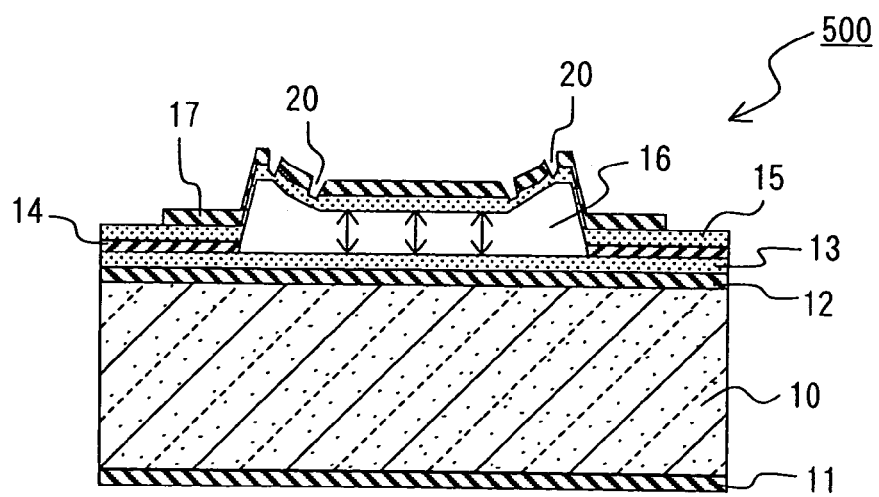
FIG. 4 is a cross sectional view showing a Fabri-Perot filter according to a third embodiment of the present invention.

For example, a Fabri-Perot filter 500 according to a third embodiment of the present invention is shown in FIG. 4. In the filter 500, the periphery portion of the movable mirror unit 30 includes a groove 20. The groove 20 does not penetrate the second mirror 15. In this case, the periphery portion has a relatively thin thickness construction, compared with the center portion so that the mechanical strength of the periphery portion is weaker than the center portion. Therefore, only the periphery portion is deformed substantially when the voltage is applied to the filter 500. Thus, the center portion is prevented from being deformed so that the center portion of the movable mirror unit 30, i.e., the bottom of the second mirror 15 remains to be flat even when the voltage is applied to the filter 500. The distance H between the first and second mirrors 13, 15 becomes homogeneous so that the movable mirror unit 30 is deformed to be a stew pan bottom, as shown in FIG. 4. Therefore, the distance H between the first mirror 13 and the displaced second mirror 15 becomes homogenous so that the range of wavelengths of the infrared light that transmits the filter 500 becomes narrower.

The groove 20 can be formed by the photo lithography method and the like. Although the groove 20 reaches the second mirror 15, the groove 20 can be formed not to reach the second mirror 15. In this case, the groove 20 is formed in the silicon nitride film 17 so that the second mirror 15 is not exposed outside.

In FIG. 4, the groove 20 is composed of two trenches, one of which is disposed on a circumference of the movable mirror unit 30, and the other one of which is disposed almost at an interface between the center portion and the periphery portion. The groove 20 can be disposed on other positions as long as the periphery portion is only deformed and the deformation of the center portion is limited when the second mirror 15 is displaced.

Although the deformation of the center portion is limited by thinning the periphery portion of the movable mirror unit 30, the deformation of the center portion can be limited by other constructions. For example, only the center portion is hardened by a light irradiation method, a quench hardening method, a chemical treatment method or the like so that the periphery portion is much deformable, compared with the center portion. Further, a through hole is formed in the periphery portion so that the mechanical strength of the periphery portion becomes weaker than the center portion. Thus, the deformation of the periphery portion is much larger than the center portion.

Such changes and modifications are to be understood as being within the scope of the present invention as defined by the appended claims.

What is claimed is:

1. A Fabri-Perot filter comprising:
 a substrate;
 a first mirror disposed on the substrate; and
 a movable mirror unit facing the first mirror with a gap therebetween,
 wherein the movable mirror unit is movable toward the first mirror in a case where a predetermined voltage is applied between the first mirror and the movable mirror unit so that the gap is changeable,
 wherein the filter is capable of transmitting an infrared light having a predetermined wavelength corresponding to the gap,
 wherein the movable mirror unit includes a center portion and a periphery portion, which is deformable easier than the center portion,
 wherein the periphery portion has a thickness thinner than the center portion.

2. The filter according to claim 1,
 wherein the center portion of the movable mirror unit includes a second mirror and a reinforcement film, which is made of a material different from the second mirror, and
 wherein the periphery portion of the movable mirror unit includes the second mirror.

3. The filter according to claim 2,
 wherein the material of the reinforcement film has an elasticity higher than that of the second mirror.

4. The filter according to claim 3,
 wherein the material of the reinforcement film is a diamond-like carbon.

5. The filter according to claim 1,
 wherein the substrate is made of semiconductor, and
 wherein the first mirror is disposed on the substrate through an insulation film.

* * * * *